June 12, 1934.   W. R. TALIAFERRO   1,962,369
SYSTEM OF SELECTIVE TRIPPING AND GROUNDING
Filed Oct. 20, 1930
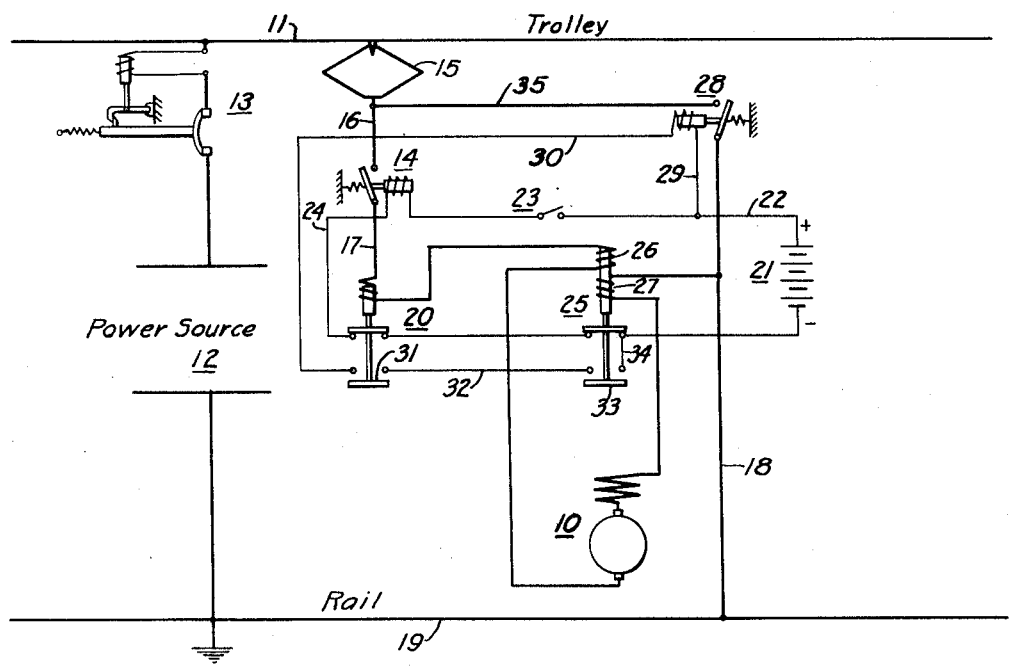
INVENTOR
William R. Taliaferro
BY
ATTORNEY Patented June 12, 1934

1,962,369

UNITED STATES PATENT OFFICE 1,962,369

SYSTEM OF SELECTIVE TRIPPING AND GROUNDING

William R. Taliaferro, Pittsburgh, Pa., assignor to Westinghouse Electric & Manufacturing Company, a corporation of Pennsylvania Application October 20, 1930, Serial No. 489,873

9 Claims. (Cl. 175—294)

My invention relates generally to systems for protecting electrical equipment and more particularly to protective systems for the traction motors of railway vehicles.

The object of my invention is to provide for protecting translating devices from excessive currents which may result from overloads or faults in the supply circuit.

A more specific object of the invention is to provide for interrupting the supply circuit of a translating device upon the occurrence of an overload or a minor fault, and, in addition, the establishment of a ground circuit which shunts the translating device when a serious fault develops within the device or on the supply line.

The invention itself, both as to its organization and method of operation, together with additional objects and advantages thereof, will best be understood from the following description of a specific embodiment, when read in connection with the accompanying drawing in which:

The single figure is a diagrammatic view of a protective system for railway motors organized in accordance with my invention.

Referring to the drawing, 10 designates generally a motor comprising armature and series field windings. As shown, the motor is connected to a trolley conductor 11. In this particular instance, a series motor is illustrated, but it is to be understood that a motor or a translating device of any other type may be protected by the system which will be set forth in detail hereinafter.

The trolley conductor may be supplied from any suitable source of power. In this particular case, the source of power is indicated by main-line conductors 12, one of which is connected to the trolley conductor through a breaker 13 of the usual type, with which overload-tripping mechanism is shown as being associated.

In order to control the motor circuit, an electromagnetic spring-biased line switch 14 is provided. In the operation of the switch 14, when the coil is energized, the switch is closed, and, when the coil is deenergized, the switch is actuated to its open position by the spring.

Assuming that the breaker 13 and the switch 14 are closed, then a motor circuit is established which extends from one of the main-line conductors 12, through breaker 13, trolley conductor 11, pantagraph 15, conductor 16, switch 14, conductor 17, motor 10 and conductor 18, to ground through the rail 19.

In order to protect the motor 10 or other translating device from overload currents, an overload relay 20 is provided, as shown. The actuating coil of the relay 20 is connected in the motor circuit and disposed to control the actuating circuit of the switch 14.

As will be observed, the actuating circuit of the switch 14 extends from the positive terminal of a control battery 21, through conductor 22, switch 23, the actuating coil of switch 14, conductor 24, relay 20 and a relay 25, to the negative terminal of the battery.

A manually operated switch 23 is provided so that the actuating circuit of the switch 14 may be interrupted at the will of the operator or when the system is not in service.

The relay 25 referred to is a differential relay, being provided with coils 26 and 27 which are connected in series-circuit relation in the motor circuit. This differential relay is disposed to cooperate with relay 20 to control the actuating circuit of a shunting switch 28.

The actuating circuit for the switch 28 may be traced from energizing conductor 22, through conductor 29, the actuating coil of switch 28, conductor 30, interlock 31—carried by the relay 20,—conductor 32, interlock 33—carried by the relay 25—and conductor 34, to the battery.

The switch 28 is somewhat similar in construction to the switch 14 and is biased to its open position by a spring, as is common practice in switches of this kind, and is designed, further, to be slightly faster in closing than switch 14 is in opening, for a reason to be later made evident.

Assuming that the switch 14 stands in its closed position and that the motor 10 is in operation, then, if an overload current occurs, the relay 20 will be actuated to its uppermost position, interrupting the actuating circuit of the switch 14, which, under the influence of the spring, will move to its open position.

In this manner, the motor circuit is interrupted, and the relay 20 is permitted to drop to its lowermost position under the action of gravity, thus re-establishing the actuating circuit for the switch 14 which is again closed.

It will be readily understood, however, that further means (not shown) well known to those skilled in the art, may be utilized to make this circuit re-establishment subject to the will of the operator, should such a feature be desired.

Assuming that a ground fault occurs at some point between the coils 26 and 27, then a greater current will flow in coil 26 than in coil 27. This will cause an unbalance in the magnetization of coils 26 and 27 which will effect the operation of the differential relay 25.

If the ground fault is of a minor nature and draws a current below that for which overload relay 20 is responsive, the motor circuit will be interrupted, as in the case of a motor overload, through the opening of line switch 14, because of the opening of differential relay 25 in the actuating circuit of switch 14.

In the event, however, that the ground fault is of a more serious nature, such as may draw an extremely high current, much above the interrupting capacity of line switch 14, not only will differential relay 25 operate, because of current unbalance, but overload relay 20 will simultaneously respond to the excessive current drawn.

The simultaneous operation of both relays 20 and 25 establishes the actuating circuit for shunting switch 28 which has been traced hereinbefore.

Upon the closure of the actuating circuit, switch 28 will be actuated to its closed position to establish a shunt circuit from the trolley conductor 11 to ground. As shown, this shunt circuit extends from the trolley conductor 11, through pantagraph 15, conductor 35, switch 28 and conductor 18, to ground through the rail 19.

The establishment of the shunt circuit through switch 28 will affect, by operating the overload trip mechanism, the opening of breaker 13, which interrupts the power circuit at the source of supply.

Although the actuating circuit of line switch 14 is interrupted by the same relay operation that completes the actuating circuit of switch 28, switch 14 does not open until after switch 28 has closed, because of the latter device being made faster in its operation, as previously mentioned.

It can thus be seen that all overloads and minor ground faults drawing currents not greater than the overload value will open the line switch 14 and thus interrupt the circuit at the translating device, while all more serious ground faults which draw currents above the overload value will close the shunting switch 28 and thereby cause the circuit to be interrupted at the source of supply.

I do not wish to be restricted to the specific structural details, arrangement of parts or circuit connections herein set forth, as other modifications thereof may be effected without departing from the spirit and scope of my invention. I desire, therefore, that only such limitations shall be imposed as are indicated in the appended claims.

I claim as my invention:

1. In a protective system for railway vehicles, in combination, a vehicle motor, a source of power for the motor, a motor circuit connecting the motor to the source of power, an overload switch for interrupting the motor circuit at the vehicle, an actuating circuit for the overload switch, and an overload relay and a differential relay connected in the motor circuit and disposed to control said actuating circuit, said overload relay being responsive to excessive load currents drawn from the source of power, and said differential relay being responsive to unbalanced currents in different portions of the motor circuit caused by a ground fault in said circuit, the operation of either of said relays causing said overload switch to be opened.

2. In a protective system for railway vehicles, in combination, a vehicle motor, a source of power for the motor, a motor circuit connecting the motor to the source of power, a grounding switch for shunting the motor circuit at the vehicle, an actuating circuit for the grounding switch, and an overload relay and a differential relay connected in the motor circuit and disposed to control said actuating circuit, said overload relay being responsive to excessive currents drawn from the source of power, and said differential relay being responsive to unbalanced currents in different portions of the motor circuit caused by a ground fault in said circuit, the simultaneous operation of both of said relays causing said grounding switch to be closed.

3. In a protective system for railway vehicles, in combination, a vehicle motor, a source of power for the motor, a motor circuit connecting the motor to the source of power, an overload switch for interrupting the motor circuit at the vehicle, a grounding switch for shunting the motor circuit at the vehicle, actuating circuits for said overload and grounding switches, and an overload relay and a differential relay connected in the motor circuit and disposed to control said switch actuating circuits, said overload relay being responsive to excessive load currents, and said differential relay being responsive to unbalanced currents in different portions of the motor circuit caused by a ground fault in said circuit, the operation of either of said relays causing said overload switch to be opened, and the simultaneous operation of both of said relays causing said grounding switch be closed.

4. In a protective system for railway vehicles in combination, a vehicle motor, a source of power for the motor, a motor circuit connecting the motor to the source of power, an overload switch for interrupting the motor circuit at the vehicle, a grounding switch for shunting the motor circuit at the vehicle, actuating circuits for said overload and grounding switches, and an overload relay and a differential relay connected in the motor circuit and disposed to control said switch actuating circuits, said overload relay being responsive to excessive load currents, and said differential relay being responsive to unbalanced currents in different portions of the motor circuit caused by a ground fault in said circuit, the operation of either of said relays causing said overload switch to be opened, and the simultaneous operation of both of said relays causing said grounding switch to be closed, said grounding switch being faster in closing than is said overload switch in opening.

5. In an electrical system comprising a translating device energized by a source of power through a supply circuit connected to the source through an excess-current-responsive circuit breaker, the combination of protective means for the translating device comprising a switch disposed to disconnect the device from the supply circuit, a second switch disposed to shunt the translating device, an overload relay, responsive to currents above the load capacity of the translating device, and a differential relay, responsive to an unbalance in the currents entering and leaving the translating device, disposed in the supply circuit, and actuating circuits for said switches controlled by said relays, the operation of either relay causing the disconnecting switch to be opened and the operation of both relays causing the shunting switch to be closed.

6. In an electrical system comprising a translating device energized by a source of power through a supply circuit connected to the source through an excess-current-responsive circuit breaker, the combination of protective means for the translating device comprising a switch disposed to disconnect the device from the supply circuit, a second switch disposed to shunt the translating device, an overload relay, responsive to currents above the load capacity of the translating device, and a differential relay, responsive to an unbalance in the currents entering and leaving the translating device, disposed in the supply circuit, and actuating circuits for said switches controlled by said relays, the operation of either relay causing the disconnecting switch to be opened and the operation of both relays causing the shunting switch to be closed, said shunting switch being faster in closing than in said disconnecting switch in opening.

7. In an electrical system comprising a translating device, a source of power for the device, and a supply circuit connecting the device to the source of power, the combination of a normally-closed switch for interrupting the supply circuit, a normally-open switch for shunting the translating device, an actuating circuit for each of said switches, an overload-relay disposed in the supply circuit to be responsive to translating-device-overload currents, and a differential relay disposed in the supply circuit to be responsive to an unbalance in the currents entering and leaving the translating device, said relays being disposed to control said switch-actuating circuits, the operation of either relay causing the circuit-interrupting switch to be opened, and the operation of both relays causing the translating-device-shunting switch to be closed.

8. In a protective system, a power supply source, apparatus to be supplied, means including a line conductor, a ground conductor and a circuit breaker for connecting said apparatus with said power source, means for operating said circuit breaker to disconnect said apparatus from said line conductor upon the occurrence of a predetermined overload thereon, and means for grounding said line conductor and for disconnecting said apparatus therefrom upon the occurrence of an unbalance in current entering and leaving said apparatus through said connecting means.

9. In a protective system, a power supply source, apparatus to be supplied, a transmission circuit including a line conductor and a ground conductor, means for connecting said supply source to said transmission circuit including a station circuit breaker between said power source and said line conductor, means for connecting said apparatus to said transmission circuit including a circuit breaker between said apparatus and said line conductor, means for operating said last-named circuit breaker to disconnect said apparatus from said line conductor upon the occurrence of a predetermined overload thereon, and means for grounding said line conductor to open said station circuit breaker upon the occurrence of an unbalance in current entering and leaving said apparatus through said connecting means.

WILLIAM R. TALIAFERRO.